United States Patent
Nishimura et al.

(10) Patent No.: US 10,363,892 B2
(45) Date of Patent: Jul. 30, 2019

(54) CRASH BOX AND METHOD FOR PRODUCING THE SAME

(71) Applicant: NIPPON STEEL CORPORATION, Tokyo (JP)

(72) Inventors: Ryuichi Nishimura, Tokyo (JP); Kenichiro Otsuka, Tokyo (JP); Yasuhiro Ito, Tokyo (JP); Yoshiaki Nakazawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 40 days.

(21) Appl. No.: 15/025,414

(22) PCT Filed: Sep. 24, 2014

(86) PCT No.: PCT/JP2014/075191
§ 371 (c)(1),
(2) Date: Mar. 28, 2016

(87) PCT Pub. No.: WO2015/053075
PCT Pub. Date: Apr. 16, 2015

(65) Prior Publication Data
US 2016/0221521 A1    Aug. 4, 2016

(30) Foreign Application Priority Data

Oct. 9, 2013   (JP) ................................. 2013-212070

(51) Int. Cl.
*F16F 7/12* (2006.01)
*B60R 19/34* (2006.01)
(Continued)

(52) U.S. Cl.
CPC ............ *B60R 19/34* (2013.01); *B23K 9/0026* (2013.01); *B23K 9/235* (2013.01);
(Continued)

(58) Field of Classification Search
CPC .. B60R 19/34; F16F 7/12; F16F 7/121; B62D 21/152; B62D 21/15; B62D 21/155
(Continued)

(56) References Cited

U.S. PATENT DOCUMENTS

| 2006/0202511 A1* | 9/2006 | Tamura | F16F 7/12 296/187.03 |
| 2008/0012386 A1* | 1/2008 | Kano | B60R 19/34 296/187.03 |
| 2015/0314743 A1* | 11/2015 | Matsushiro | B60R 19/34 293/133 |

FOREIGN PATENT DOCUMENTS

| CN | 101104396 | 1/2008 |
| JP | 2004-182088 | 7/2004 |

(Continued)

OTHER PUBLICATIONS

Machine translation of JP 2012-035771 (no date).*

*Primary Examiner* — Nicholas J Lane
(74) *Attorney, Agent, or Firm* — Clark & Brody

(57) ABSTRACT

A crash box has excellent axial crushing performance and in which, even if the sheet thickness of a tubular body constituting the crash box is smaller than 1.4 mm, good welding can be performed with the tubular body butted against a set plate. The crash box (1) having a metallic longer-length tubular body and a method for producing the crash box are provided. The tubular body has a basic cross-sectional shape that is a flat polygon surrounded by a plurality of ridges (2-1 to 2-4) extending in a longitudinal direction and a plurality of side wall portions (4), includes one or more groove portions (3-1 and 3-2) on side wall portions (4) on long sides substantially parallel to the major axis direction of the cross section that extend in longitudinal direction, and includes outward flanges (5-1 to 5-4) in an end portion in the longitudinal direction.

10 Claims, 8 Drawing Sheets

(51) Int. Cl.
  *B62D 21/15*   (2006.01)
  *B23K 26/21*   (2014.01)
  *B23K 9/00*    (2006.01)
  *B23K 9/235*   (2006.01)
  *B23K 26/00*   (2014.01)
  *B23K 31/02*   (2006.01)
(52) U.S. Cl.
  CPC .......... *B23K 26/0093* (2013.01); *B23K 26/21* (2015.10); *B23K 31/02* (2013.01); *B62D 21/15* (2013.01); *F16F 7/12* (2013.01)
(58) Field of Classification Search
  USPC ........................................................ 188/377
  See application file for complete search history.

(56) References Cited

FOREIGN PATENT DOCUMENTS

| | | |
|---|---:|---:|
| JP | 3912422 | 5/2007 |
| JP | 2008-018792 | 1/2008 |
| JP | 2008-261493 | 10/2008 |
| JP | 2008-265654 | 11/2008 |
| JP | 2012-007649 | 1/2012 |
| JP | 2012-035771 | 2/2012 |
| JP | 2012-162108 | 8/2012 |
| JP | 2012-224099 | 11/2012 |
| JP | 2013-087880 | 5/2013 |
| JP | 2013-159254 | 8/2013 |
| WO | 2012/140930 | 10/2012 |

\* cited by examiner

CRASH BOX AND METHOD FOR PRODUCING THE SAME

TECHNICAL FIELD

The present invention relates to a crash box that is to be attached to an automobile body, and to a method for producing the crash box. In particular, the present invention relates to, a crash box that is to be attached to, for example, the front portion or the rear portion of an automobile body and includes a tubular body that buckles and is plastically deformed into a bellows when loaded with impact load in the axis direction of the tubular body, so as to absorb impact energy, the tubular body being a molded body made of a metal sheet and to a method for producing the crash box.

BACKGROUND ART

An impact energy absorbing member that buckles by an impact load in a collision to absorb collision energy is attached to a vehicle. As one such impact energy-absorbing member, a crash box is known. A crash box includes a tubular body that is disposed in the front and rear of a vehicle, being oriented in a front-back direction. The crash box includes a set plate (an attachment plate) that is welded to this tubular body at one end portion in the longitudinal direction of the tubular body by butt arc welding or the like.

A crash box is required to repeatedly and stably buckle in its axis direction when loaded with a collision load in the axis direction of the tubular body of the crash box. The present applicants have disclosed in, for example, Patent Document 1, a patented invention relating to a crash box that includes a tubular body with groove portions. The groove portions are each provided in such a manner as to project inward from a long side of a polygon that forms the cross section of the crash box, and to extend in the axis direction of the crash box. This crash box is ensured to, by an impact load loaded in the axis direction, repeatedly buckle and to be plastically deformed into a bellows so as to absorb impact energy.

In recent years, in order to reduce the weight of a vehicle, there has been considered the reduction in the sheet thickness of a tubular body constituting a crash box. However, if the sheet thickness of the tubular body of the crash box disclosed in Patent Document 1 is reduced to about 1.2 to 1.4 mm or smaller, the end portion of the tubular body is burned through by heat input in butt arc welding with a set plate, raising the risk of declining the strength of a weld zone.

The present applicant has proposed, in Patent Document 2, a crash box that has one end portion in the axis direction of a metallic tubular body, the one end portion being folded back 180 degrees to be formed into a folded portion.

LIST OF PRIOR ART DOCUMENTS

Patent Document

Patent Document 1: JP3912422B
Patent Document 2: JP2008-261493A

DISCLOSURE OF THE INVENTION

Problems to be Solved by the Invention

The above problem can be solved with the crash box disclosed in Patent Document 2 to some extent. However, the crash box has a problem in that the existence of the folded portion makes the plastic deformation into a bellows hard to occur, which reduces impact energy absorbing performance, and in that molding the folded portion is difficult if the tubular body is formed of a high-strength steel sheet.

An objective of the present invention is to provide a lightweight crash box and a method for producing the crash box, the crash box including a tubular body that can be well welded, with the tubular body butted against a set plate, even if the sheet thickness of the tubular body constituting the crash box is smaller than 1.4 mm.

Means for Solving the Problems

The present invention will be described as follows.

(1) A crash box comprising a longer-length metallic tubular body,
the tubular body having a basic cross-sectional shape that is a polygon surrounded by a plurality of ridges extending in one direction and a plurality of side wall portions, the tubular body including one or more groove portions in side wall portions on long sides that are substantially parallel to the major axis direction of the cross section, the groove portions extending in the one direction, and the tubular body including outward flanges in an end portion in the one direction.

In other words, in the crash box that includes a longer-length tubular body made of a steel sheet, the tubular body having a basic cross-sectional shape that is a polygon surrounded by a plurality of ridges extending in one direction and a plurality of side wall portions, the tubular body including one or more groove portions in side wall portions on long sides substantially parallel to the major axis direction of the cross section, the groove portions extending in the one direction, characterized in that the tubular body includes outward flanges in an end portion in the one direction.

In the present invention, if the polygon is a rhombus, the long side in the present invention refers to each side of the rhombus.

(2) The crash box according to the section 1, wherein the polygon is a flat polygon.

(3) The crash box according to the section 1 or the section 2, wherein the outward flanges are provided in all the ridges excluding at least regions of the end portion corresponding to a groove portion.

(4) The crash box according to any one of the section 1 to the section 3, wherein the outward flanges are molded integrally with the tubular body.

(5) The crash box according to any one of the section 1 to the section 4, wherein the tubular body is a press molded body of the metal sheet.

(6) The crash box according to any one of the section 1 to the section 5, wherein the metal sheet has a sheet thickness of 1.2 mm or smaller.

(7) The crash box according to any one of the section 1 to the section 5, wherein the metal sheet has a sheet thickness of 1.0 mm or smaller.

(8) The crash box according to any one of the section 1 to the section 7, wherein the metal sheet is a steel sheet having a tensile strength of 440 MPa or higher.

(9) The crash box according to any one of the section 1 to the section 7, wherein the metal sheet is a steel sheet having a tensile strength of 590 MPa or higher.

(10) The crash box according to any one of the section 1 to the section 9, wherein the polygon is a substantial quadrilateral.

(11) The crash box according to any one of the section 1 to the section 10, further comprising a set plate that is welded with the outward flanges interposed therebetween.

(12) The crash box according to the section 11, wherein the set plate includes a locking section that is provided projecting from a surface of the plate and is butted against an inner surface of an end portion in a longitudinal direction of the tubular body.

(13) The crash box according to claim 12, wherein the locking section includes a curved portion (rise-up curvature portion) that is butted against a curved portion formed in an end portion in one direction of the tubular body so as to support the curved portion.

(14) A method for producing the crash box according to any one of the section 1 to the section 10, the method comprising following First Step and Second Step;

First Step: a step of using a pressing device including: a punch that includes a groove portion that extends in one direction and a side wall provided in an end portion in the one direction; a die that is disposed facing the punch; and a pad that includes a protrusion extending in the one direction, to depress a developed blank of the tubular body into the groove portion of the punch by a protrusion of the pad and bend the developed blank using the die and the punch, so as to produce two press molded bodies with an open cross-section, the press molded bodies each having a basic cross-sectional shape that is a polygon surrounded by a plurality of ridges extending in the one direction and a plurality of side wall portions, the press molded bodies each including one or more groove portions in side wall portions on long sides substantially parallel a major axis direction of the cross section, the groove portions extending in the one direction, and the press molded bodies each including outward flanges in an end portion in the one direction, the outward flanges being continuous in a part of region along a cross-section circumferential direction; and Second Step: a step of overlapping and welding the two press molded bodies produced through the first step, at plane portions that are each formed at both ends in a cross-section circumferential direction of each of the two press molded bodies, so as to produce the tubular body.

(15) The method for producing a crash box according to the section 14, wherein the pad includes restraining portions that restrain portions in the developed blank to be molded into ridges in a vicinity of outward flanges, the portions in the developed blank to be molded into the ridge in the vicinity of the outward flanges are retained by the restraining portions.

(16) A method of producing the crash box according to any one of the section 11 to the section 13, the method comprising following First Step, Second Step, and Third Step;

First Step: a step of, using a pressing device including: a punch that includes a groove portion that extends in one direction and a side wall provided in an end portion in the one direction; a die that is disposed facing the punch; and a pad that includes a protrusion extending in the one direction, to depress a developed blank of the tubular body into the groove portion of the punch by a protrusion of the pad and bend the developed blank using the dies and the punch, so as to produce two press molded bodies with an open cross-section, the press molded bodies each having a basic cross-sectional shape that is a polygon surrounded by a plurality of ridges extending in the one direction and a plurality of side wall portions, the press molded bodies each including one or more groove portions in side wall portions on long sides substantially parallel a major axis direction of the cross section, the groove portions extending in the one direction, and the press molded bodies each including outward flanges in an end portion in the one direction, the outward flanges being continuous in a part of region along a cross-section circumferential direction; and Second Step: a step of overlapping and welding the two press molded bodies produced through the first step, at plane portions that are each formed at both ends in a cross-section circumferential direction of each of the two press molded bodies, so as to produce the tubular body.

Third Step: a step of overlapping the tubular body obtained through the second step and the set plate with the outward flanges interposed therebetween, and attaching the tubular body to the set plate by spot welding, fillet arc welding, or laser welding.

(17) The method for producing a crash box according to claim 16, wherein the set plate includes a locking section that is provided projecting from a surface of the plate and is butted against an inner surface of an end portion in a longitudinal direction of the tubular body.

Advantageous Effects of the Invention

According to the present invention, it is possible to perform spot welding, fillet arc welding, or laser welding with outward flanges formed on a tubular body and a set plate made to overlap with each other. For this reason, even if the sheet thickness of the tubular body is less than 1.4 to 1.2 mm, the occurrence of poor welding such as burn-through, which is a problem with the prior art, is prevented, increasing strength in a weld zone. This allows for providing a lightweight crash box that includes a tubular body having a sheet thickness of less than 1.4 to 1.2 mm.

In addition, in a crash box including curved portions (rise-up curvature portions) and outward flanges in an end portion in a longitudinal direction, in the case where the sheet thickness of a tubular body is, in particular, smaller than 1.2 mm, an impact load causes the end portion in the longitudinal direction of the tubular body to collapse inside the cross section, generating deformation that hinders stable repetitive buckling. This phenomenon occurs conspicuously in particular when the impact load acts in a direction oblique to the axis direction of the tubular body.

The present invention uses a set plate including locking sections that are provided projecting from a surface of the plate and are butted against the inner surface of the tubular body to retain an end portion in the longitudinal, direction of the tubular body. Accordingly, it is possible to suppress the above collapse, increasing the impact energy absorbing performance of a crash box that includes a tubular body having a small sheet thickness.

BRIEF DESCRIPTION OF THE DRAWINGS

FIG. 1A is a perspective view illustrating the entirety thereof, FIG. 1B is a front view, FIG. 1C is a side view, and FIG. 1D to F are illustrative diagrams illustrating examples of the positions of outward flanges.

FIG. 6A illustrates First Step, FIG. 6B illustrates Second Step, and FIG. 6C illustrates Third Step.

MODE FOR CARRYING OUT THE INVENTION

The present invention will be described with reference to the accompanying drawings.
1. Crash box 0

Figure 1:
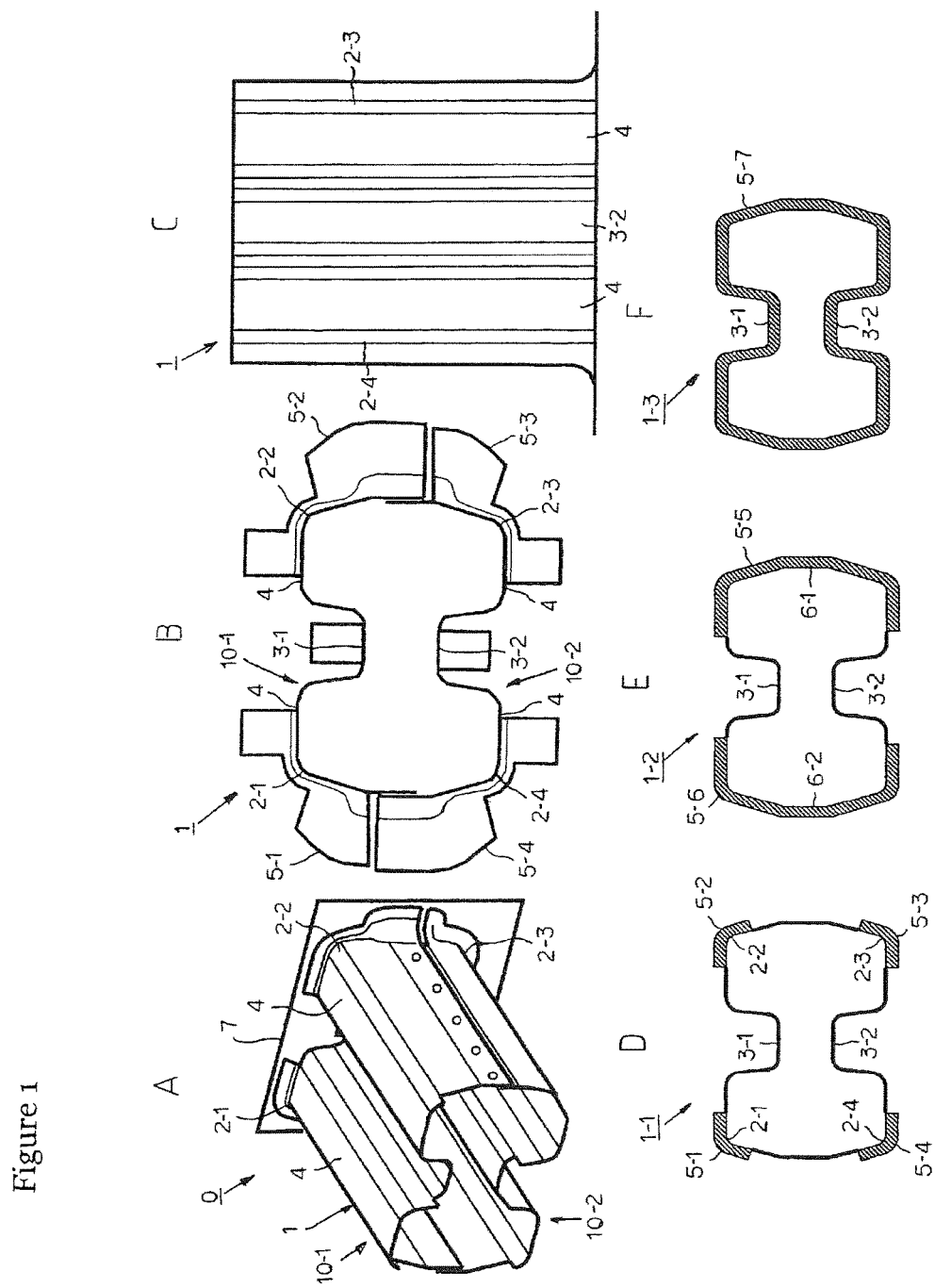
FIG. 1 is an illustrative diagram illustrating a tubular body that constitutes a crash box of the present embodiment, where

FIG. 1 is an illustrative diagram illustrating a tubular body 1 that constitutes a crash box 0 according to the present invention, where FIG. 1A is a perspective view illustrating the entirety thereof, FIG. 1B is a front view of the tubular body 1, FIG. 1C is a side view of the tubular body 1, and FIGS. 1D to F are cross sectional views of modifications 1-1 to 1-3 of the tubular body 1.

The crash box 0 includes a metallic tubular body 1. The tubular body buckles into a bellows upon receiving an impact load that is applied in the axis direction of the tubular body 1, so as to absorb collision energy.

As illustrated in FIGS. 1A and 1B, the tubular body 1 has a basic cross section that is a flat substantial quadrilateral. The tubular body 1 includes one or more groove portions 3-1 and 3-2 each of which extends in the longitudinal direction of the tubular body 1. The groove portions 3-1 and 3-2 are provided in positions excluding ridges 2-1 to 2-4 that constitute the basic cross section. The groove portions 3-1 and 3-2 are provided in side wall portions 4 on long-side face sides that are parallel to the major axis direction of the cross section. The groove portions 3-1 and 3-2 are groove portions each projecting toward the inside of the cross section.

In this description, the tubular body 1 is used that has a cross sectional shape being a substantial quadrilateral. However, the present invention is not limited to this cross-sectional shape. The tubular body 1 in the present invention may have a cross sectional shape of, for example, a flat substantial polygon such as a hexagon and an octagon. Preferably, the basic cross section is a flat substantial quadrilateral, and one or more groove portions 3-1 and 3-2 are formed in two side wall portions 4 and 4 on long-side face sides.

As illustrated in FIG. 1A and 1B, the tubular body 1 is formed by a first press molded body 10-1 and a second press molded body 10-2 in combination, which will be described later. Each of the first press molded body 10-1 and the second press molded body 10-2 is a press molded bodies made of a metal sheet.

In an end portion of the tubular body 1 in its longitudinal direction, outward flanges 5-1 to 5-4 are provided in the region of the side wall portion 4 excluding the groove portions 3-1 and 3-2. The outward flanges 5-1 to 5-4 are molded integrally with the tubular body 1.

The outward flanges 5-1 to 5-4 includes flat portions along the circumferential direction of the cross-section, the flat portions each having a width of 2 mm or more. A width B1 of the outward flanges 5-1 to 5-4 along the ridges 2-1 to 2-4 is 2 mm or more. A width B2 of the outward flanges 5-1 to 5-4 along the region other than the ridges 2-1 to 2-4 is 10 mm or more. Now, the width of the flange means a length in a direction perpendicular to the cross-section circumferential direction of the outward flange region (the length of only the flat portion, not including a curved portion).

This description will be made about the case where spot welding with the set plate is not performed on the outward flanges 5-1 to 5-4 along the ridges 2-1 to 2-4, but on outward flanges 5-1 to 5-4 along the region other than the ridges 2-1 to 2-4. The present invention is not limited to this case. As illustrated in FIG. 1D, the outward flanges 5-1 to 5-4 may be provided at least in the range along the ridges 2-1 to 2-4, and as illustrated in FIG. 1E, it is preferable that, in addition to the ridges 2-1 to 2-4, outward flanges 5-5 and 5-6 are provided on short-side side wall portions 6-1 and 6-2, such that all portions other than the groove portions are provided with the outward flanges. As illustrated in FIG. 1F, it is more preferable that an outward flange 5-7 is provided on the entire circumference of the cross-section.

The width of the outward flanges 5-1 to 5-4 is 2 mm or more in portions where laser welding or fillet arc welding is to be performed, and 10 mm or more in portions where spot welding will be performed.

The cross-sectional shape of the groove portions 3-1 and 3-2 each have substantial trapezoid or triangular shape, the groove depth of which is 10 to 35 mm. If the width of the bottom of the groove portions 3-1 and 3-2 is insufficient, or if the depth of the groove bottoms 3-1 and 3-2 is insufficient, the buckling deformation of the tubular body 1 becomes unstable, and it is thus difficult to obtain sufficiently the advantageous effect of improving an impact energy absorbing performance that is brought by the provision of the groove portions 3-1 and 3-2.

The length of the tubular body 1 in its axis direction is 80 to 300 mm, from the practical viewpoint.

The sheet thickness of the tubular body 1 is assumed to be smaller than 1.4 mm, but is not limited to this configuration, and can be 1.4 mm or larger. Note that the sheet thickness is preferably smaller than 1.4 mm, more preferably 1.2 mm or smaller, and most preferably 1.0 mm or smaller. The lower limit value of the sheet thickness of the tubular body 1 is preferably 0.5 mm or higher, from the viewpoint of ensuring a desired energy absorption. This allows achieving the reduction of the crash box 0 in weight.

The material of the tubular body 1 is assumed to be made of a metal, and preferably made of a steel sheet, more preferably made of a high-tensile steel sheet having a tensile strength of 440 MPa or higher, and still more preferably made of a high-tensile steel sheet having a tensile strength of 590 MPa or higher.

Figure 2:
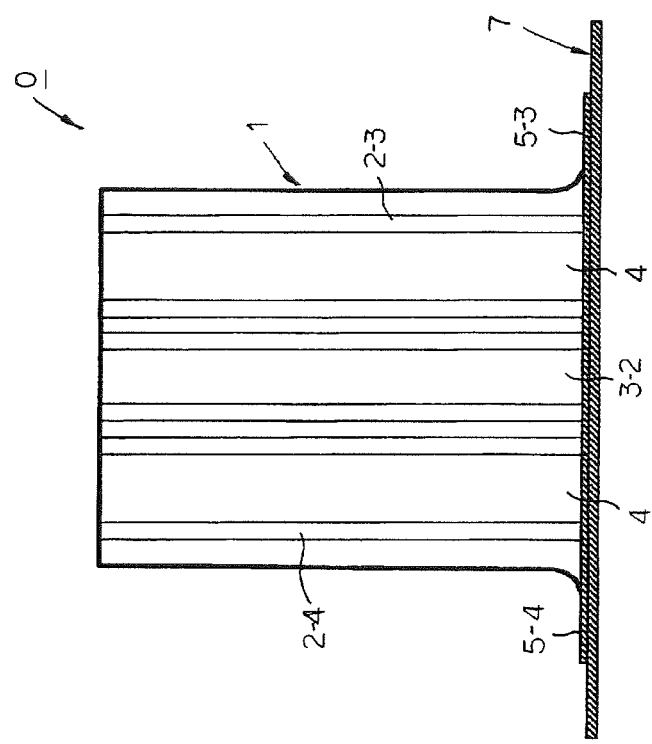
FIG. 2 is an illustrative diagram schematically illustrating the state where the tubular body and a set plate of the crash box are attached to each other.

FIG. 2 is an illustrative diagram illustrating the state where the tubular body 1 and a set plate 7, which constitute the crash box 0, are attached to each other.

As illustrated in FIG. 2, the crash box 0 includes the tubular body 1, which is described above, and the set plate 7. The set plate 7 is attached to the tubular body 1 with the outward flanges 5-1 to 5-4 provided in one end portion of the tubular body 1 interposed therebetween, by welding. One such welding is laser welding, fillet arc welding, spot welding, or the like.

Figure 3:
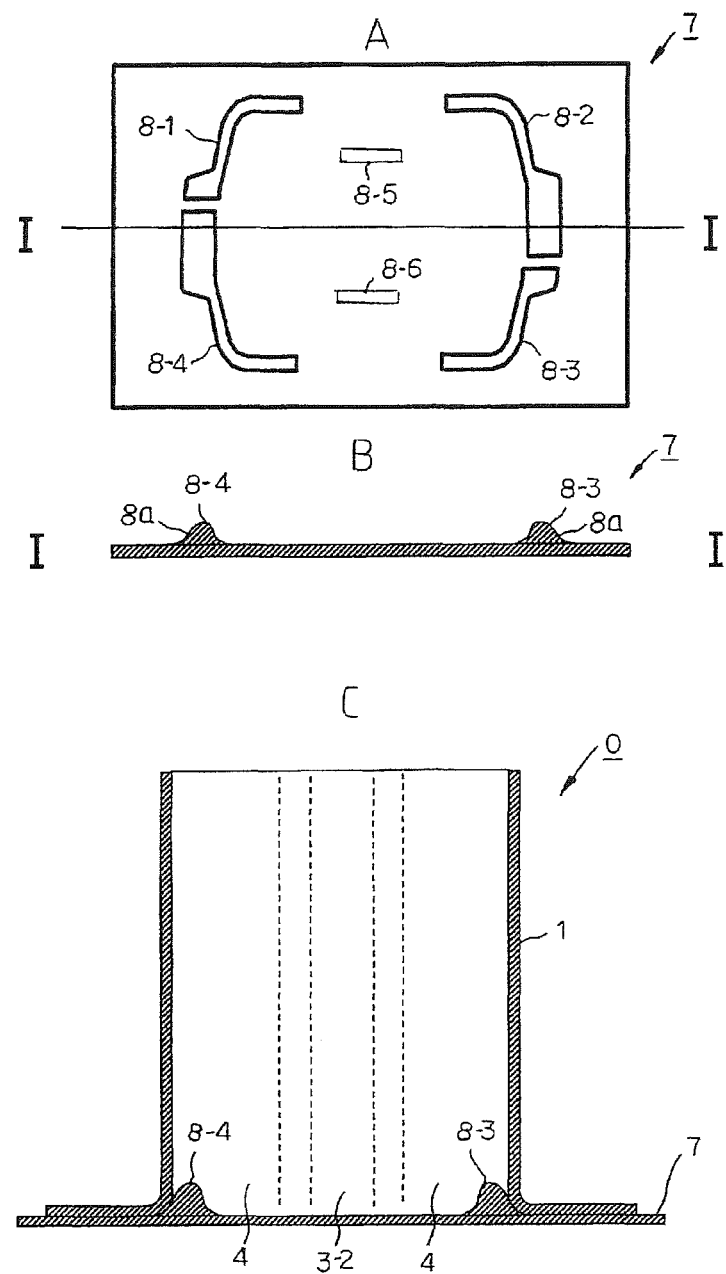
FIG. 3 is an illustrative diagram schematically illustrating locking sections provided in the set plate.

FIG. 3 is an illustrative diagram schematically illustrating locking sections 8-1 to 8-4 that are provided in the set plate 7, where FIG. 3A is a plan view of the set plate 7, FIG. 3B is a cross sectional view of the set plate 7 taken along the line I-I, and FIG. 3C is an illustrative diagram schematically illustrating the state where the tubular body 1 are the set plate 7 are combined with each other.

As illustrated in FIG. 3, the set plate 7 includes the locking sections 8-1 to 8-4. The locking sections 8-1 to 8-4 are provided projecting from a surface of the plate 7. The locking sections 8-1 to 8-4 are butted against the inner surface of the tubular body 1 to retain one end portion in the longitudinal direction of the tubular body 1. That is, the locking sections 8-1 to 8-4 support the portions, along the ridges 2-1 to 2-4, of the curved portions (rise-up curvature portions) of the outward flanges 5-1 to 5-4 in one end portion in the longitudinal direction of the tubular body 1, from the inside of the main body 1. The locking sections 8-1 to 8-4 preferably retain all the portions of the curved portions (rise-up curvature portions) of the outward flanges 5-1 to 5-4 excluding the groove bottom portion, from the inside of the tubular body 1.

As seen above, the locking sections 8-1 to 8-4 preferably have curved portions 8a that are configured to be butted against the curved portions (rise-up curvature portions) of the outward flanges 5-1 to 5-4 so as to support the curved portions.

Note that it is preferable that the set plate 7 is formed integrally. In this case, instead of forming the four locking sections 8-1 to 8-4 individually, but for example, the locking sections 8-1 and 8-4 may be integrally and consecutively formed while the locking sections 8-2 and 8-3 may be integrally and consecutively formed. In addition, locking sections 8-5 and 8-6 may be further provided together with the locking sections 8-1 and, 8-4. The locking sections 8-5 and 8-6 retain portions corresponding to the groove portions 3-1 and 3-2 from the inside of the tubular body 1.

The locking sections 8-1 to 8-4 may exist in the curved portions (rise-up curvature portions) of the flanges of the tubular body 1, for example, in the portions corresponding to R1 to 10 mm. The locking sections 8-1 to 8-4 each preferably have a height that is about one to ten times the sheet thickness of a metal sheet forming the flange. The set plate 7 is manufactured by pressing, for example, a steel sheet having a tensile strength of 270 to 980 MPa-class.

The crash box 0 according to the present invention is configured as described above.

2. Method for Manufacturing Crash Box 0

Figure 6:
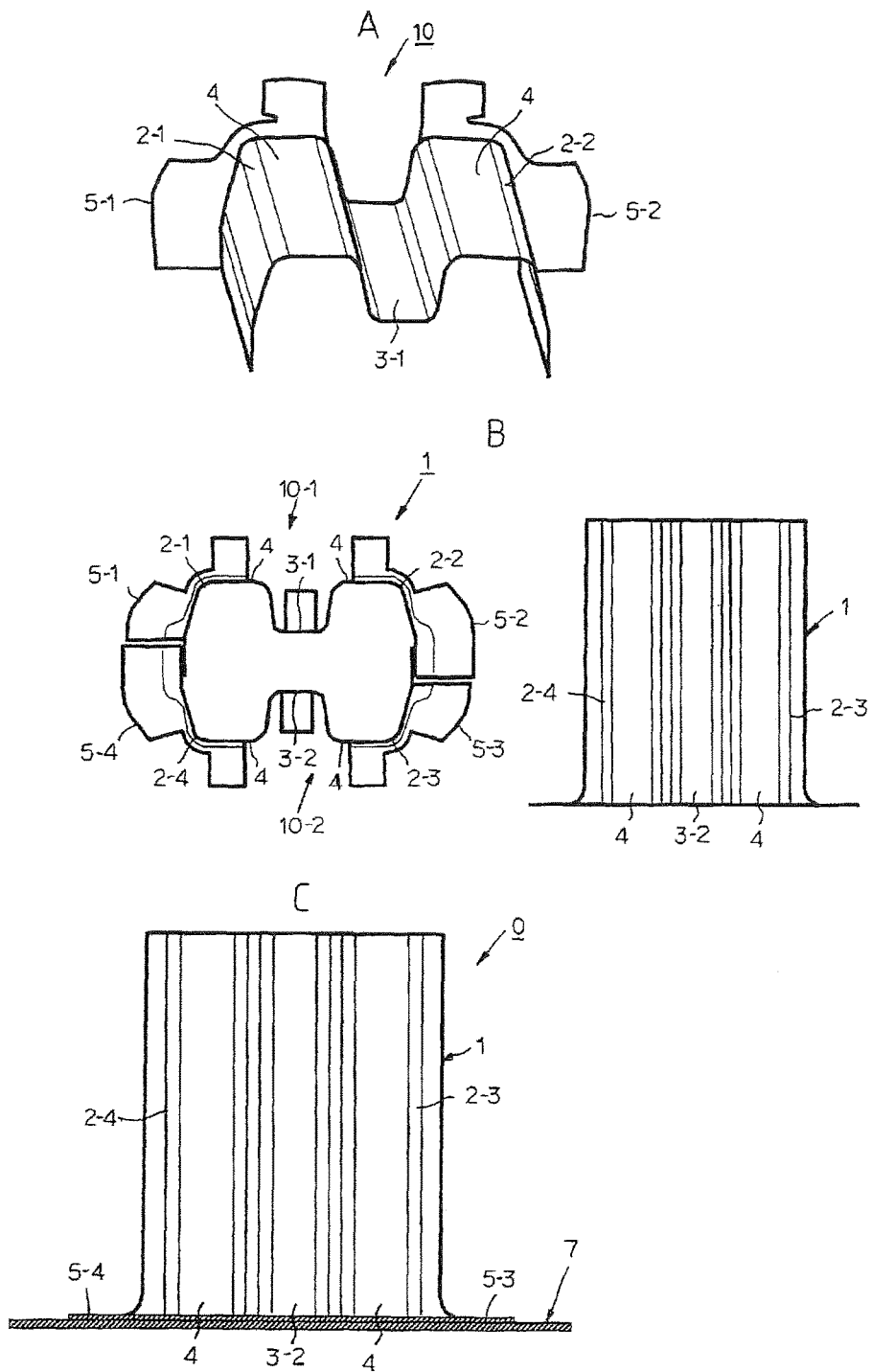
FIG. 6 is an illustrative diagram schematically illustrating a method for producing a crash box according to the present invention, where

FIG. 6 is an illustrative diagram schematically illustrating a method for producing the crash box 0 according to the present invention, where FIG. 6A illustrates a first step, FIG. 6B illustrates a second step, and FIG. 6C illustrates a third step.

The tubular body 1 that constitutes the crash box 0 through:

First Step: producing two press molded bodies 10 each having an open cross-section from developed blanks, which will be described later (FIG. 6A); and Second Step: producing the tubular body 1 from the two press molded bodies 10 and 10 (FIG. 6B).

Furthermore, as illustrated in FIG. 6C, the crash box 0 including the tubular body 1 and the set plate 7 is produced through a third step of attaching the set plate 7, by spot welding or the like, to the tubular body 1 that is produced through the second step. Note that the two press molded bodies 10 and 10 both have an open cross-sectional shape that is obtained by dividing the tubular body 1 into substantially two equal portions by a plane including the central axis of the tubular body 1.

[First Step]

Figure 4:
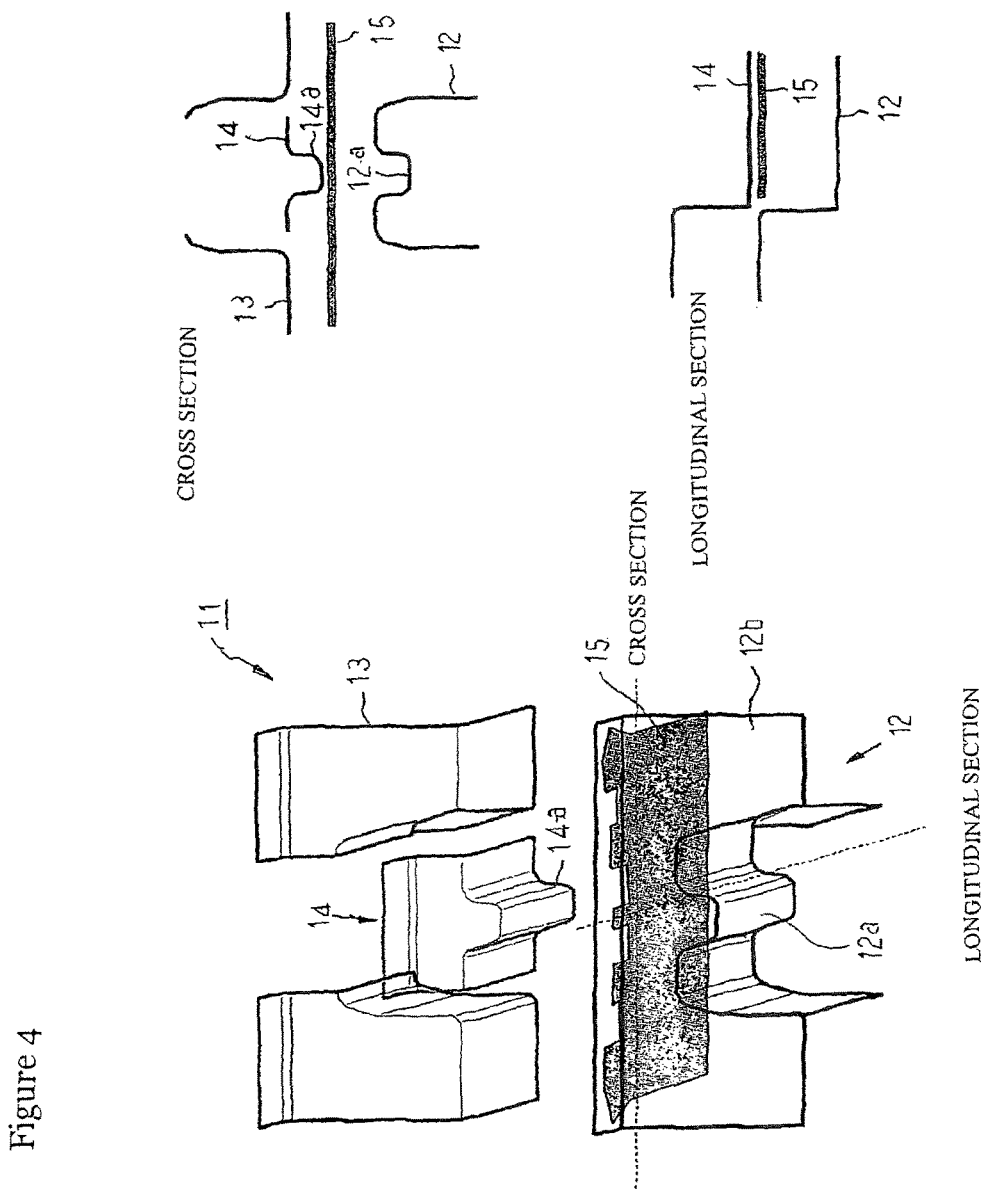
FIG. 4 is a schematic diagram illustrating an example of the configuration of a pressing device for producing a press molded body.

FIG. 4 is a schematic diagram illustrating an example of the configuration of a pressing device 11 for producing the press molded body 10.

In the first step, the pressing device 11 is used as illustrated in FIG. 4. The pressing device 11 includes a punch 12, a die 13, and a pad 14. The punch 12 includes a groove portion 12a that extends in one direction (the longitudinal direction), and a side wall 12b that is provided in an end portion in the longitudinal direction. The die 13 is disposed facing the punch 12. The pad 14 includes a protrusion 14a that extends in the longitudinal direction and is disposed facing the punch 12.

By press molding the developed blanks 15 using the pressing device 11, two press molded bodies 10, namely, a first press molded body 10-1 and a second press molded body 10-2 are produced. The two press molded bodies 10 have groove portions 3-1 and 3-2 that run in one direction and includes outward flanges 5-1 to 5-4 that are formed in one end portion of a longitudinal direction.

In the press molding in the first step, the developed blank 15 is depressed into the groove portion 12a of the punch 12 by the protrusion 14a provided in the pad 14, and the developed blank 15 is bent by the die 13 and the punch 12. This yields a metal sheet provided with a groove portion 3-1 that runs in the longitudinal direction and outward flanges 5-1 and 5-2 that are formed in an end portion in the longitudinal direction, in at least regions along a circumferential direction in the cross-section excluding the groove portion 3-1. Hereafter, the pad 14 will be also referred to as a normal pad.

Note that the developed blank 15 refers to a blank having an external shape obtained by developing the press molded body 10 to a flat shape.

The above description of the first step is made about a method of press molding using the pressing device 11, but the first step is not limited to this molding method.

Figure 5:
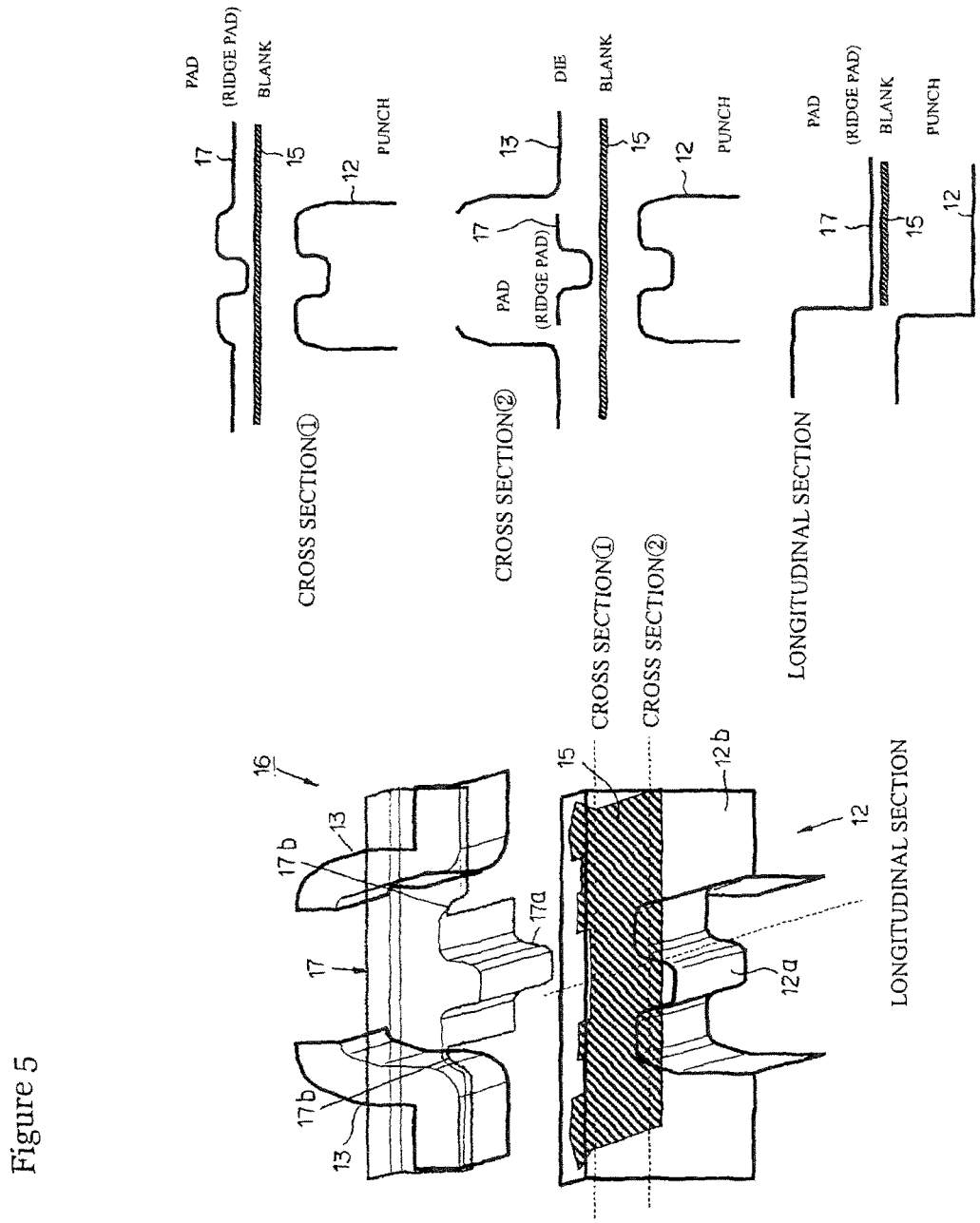
FIG. 5 is a schematic diagram illustrating the other example of the configuration of the pressing device for producing the tubular body of the embodiment.

As the other molding method, for example, a pressing device 16 illustrated in FIG. 5 can be used.

FIG. 5 is a schematic diagram illustrating a configuration example of the pressing device 16 that is the other pressing device for producing the press molded body 10.

The pressing device 16 includes a punch 12 and a die 13 and further includes a pad 17 (hereafter, also referred to as a ridge pad). The punch 12 includes a groove portion 12a that extends in one direction, and a side wall 12b that is provided in an end portion in the longitudinal direction. The die 13 is disposed facing the punch 12. The pad 17 includes a protrusion 17a that is disposed facing the punch 12 and runs in one direction, and restraining portions 17b that restrain the vicinity of portions in the developed blank 15 that are to be molded into ridges 2-1 and 2-2 in the vicinity of the outward flanges 5-1 and 5-2.

In press molding, the restraining portions 17b restrain the portions in the developed blank 15 that are to be molded into the ridges 2-1 and 2-2 in the vicinity of the outward flanges 5-1 and 5-2. In addition, the protrusion 17a of the ridge pad 17 depresses the developed blank 15 to the groove portion 12a of the punch 12. Furthermore, the die 13 and the punch 12 bend the developed blank 15. This suppresses poor molding that occurs in the outward flanges 5-1 and 5-2 along the ridges 2-1 and 2-2 in press molding.

This produces the press molded body 10, the open cross-section of which has the groove portion 3-1 extending in the longitudinal direction and the outward flanges 5-1 and 5-2, in an end portion in the longitudinal direction, the outward flanges 5-1 and 5-2 being continuous in the entire or a part of the region along the cross-section circumferential direction.

If portions or the like right under the ridge pad 17 corresponding to the ridges 2-1 and 2-2 are not completely molded in the molding process using the ridge pad 17, the portions may be molded by following press working that includes bending (restrike), which is performed in typical press molding.

[Second Step]

In the second step, the first press molded body 10-1 and the second press molded body 10-2 are made to overlap each other at plane portions that are formed at both ends of their cross-section circumferential direction, and the overlapping portions are attached to each other by appropriate welding means such as laser welding and spot welding, so as to produce the tubular body 1.

[Third Step]

In the third step, the tubular body 1 obtained in the second step is welded to the set plate 7 with the outward flanges 5-1 to 5-4 interposed therebetween, by welding means such as laser welding, spot welding, and fillet arc welding. As the set plate 7, it is preferable to use a set plate provided with the locking sections 8-1 to 8-4.

In the above description, the employed form is a form that includes the continuous outward flanges 5-1 to 5-4 in the region excluding the groove portion, but is not limited to this form, and may be a form in which the outward flanges 5-1 to 5-4 formed in the above region have notches in portions of the flanges other than those corresponding to the ridges 2-1 to 2-4 excluding the groove portions.

The width or shape of the outward flanges 5-1 to 5-4 can be modified as appropriate by adjusting the shape of the developed blank 15.

EXAMPLE

Deformation behavior in the press molding of developed blanks into the press molded bodies 10-1 and 10-2 (the first and the second press molded bodies) using the pressing device 11 including the normal pad 14 illustrated in FIG. 4 or the pressing device 16 including the ridge pad 17 illustrated in FIG. 5, was analyzed by Finite Element Method) (Analysis 1).

Figure 7:
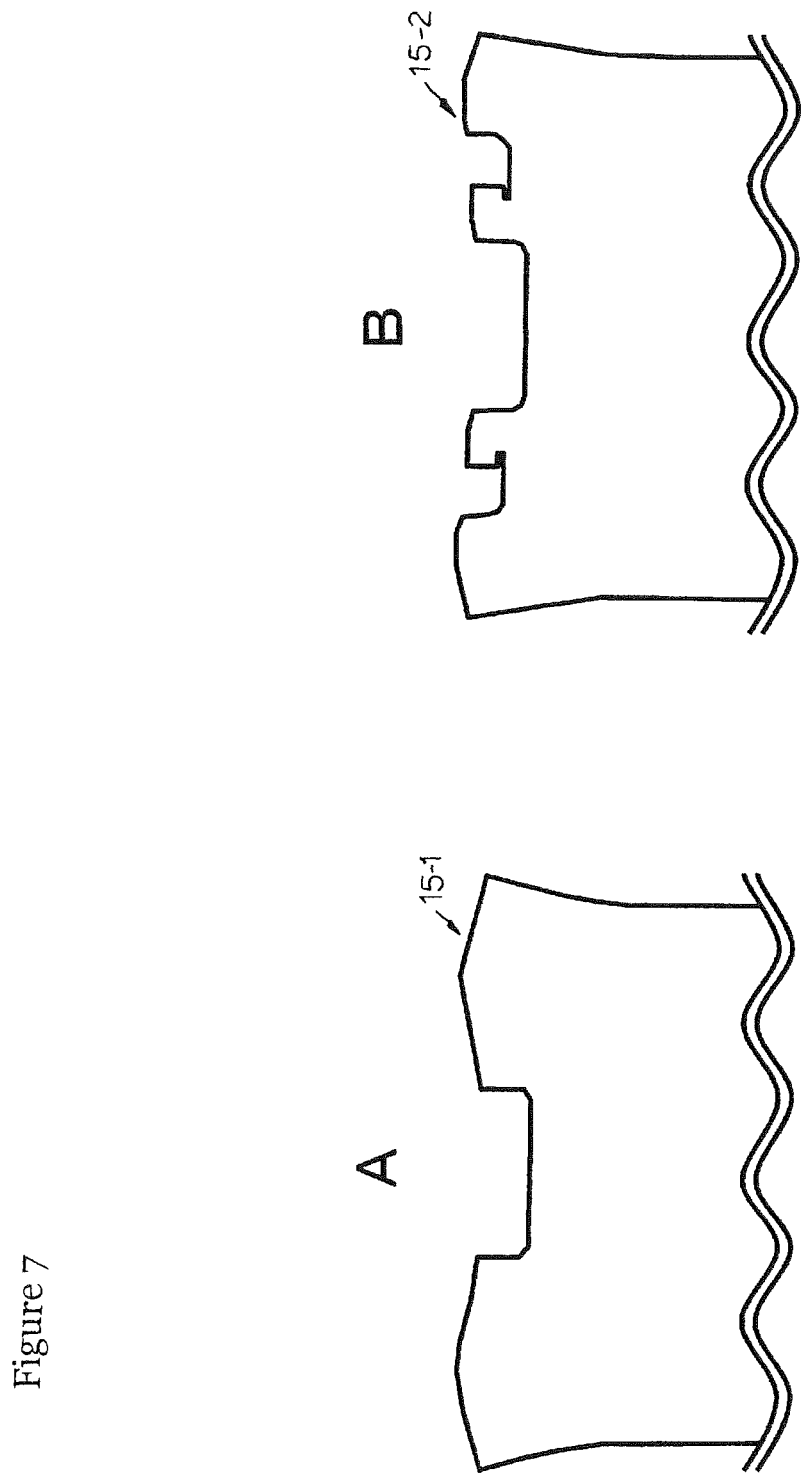
FIGS. 7A and 7B are illustrative diagrams schematically illustrating the shapes of developed blanks in examples.

FIG. 7 is an illustrative diagram schematically illustrating shapes of developed blanks 15-1 and 15-2 in the example.

As the developed blanks, as illustrated in FIG. 7A and 7B, the blanks 15-1 and 15-2 of two types were used that were adjusted such that the outward flanges 5-1 to 5-4 to be formed in an end portion of the tubular body 1 were formed in the entire region in the cross-section circumferential direction excluding parts of region along the groove portions 3-1 and 3-2. The developed blank 15-1 was formed such that the width of the outward flanges 5-1 to 5-4 was substantially uniform and 15 mm. The developed blank 15-2 was formed such that the width of the outward flanges 5-1 to 5-4 along the ridges 2-1 to 2-4 was 2 mm and the width of the other portions was 15 mm.

Figure 8:
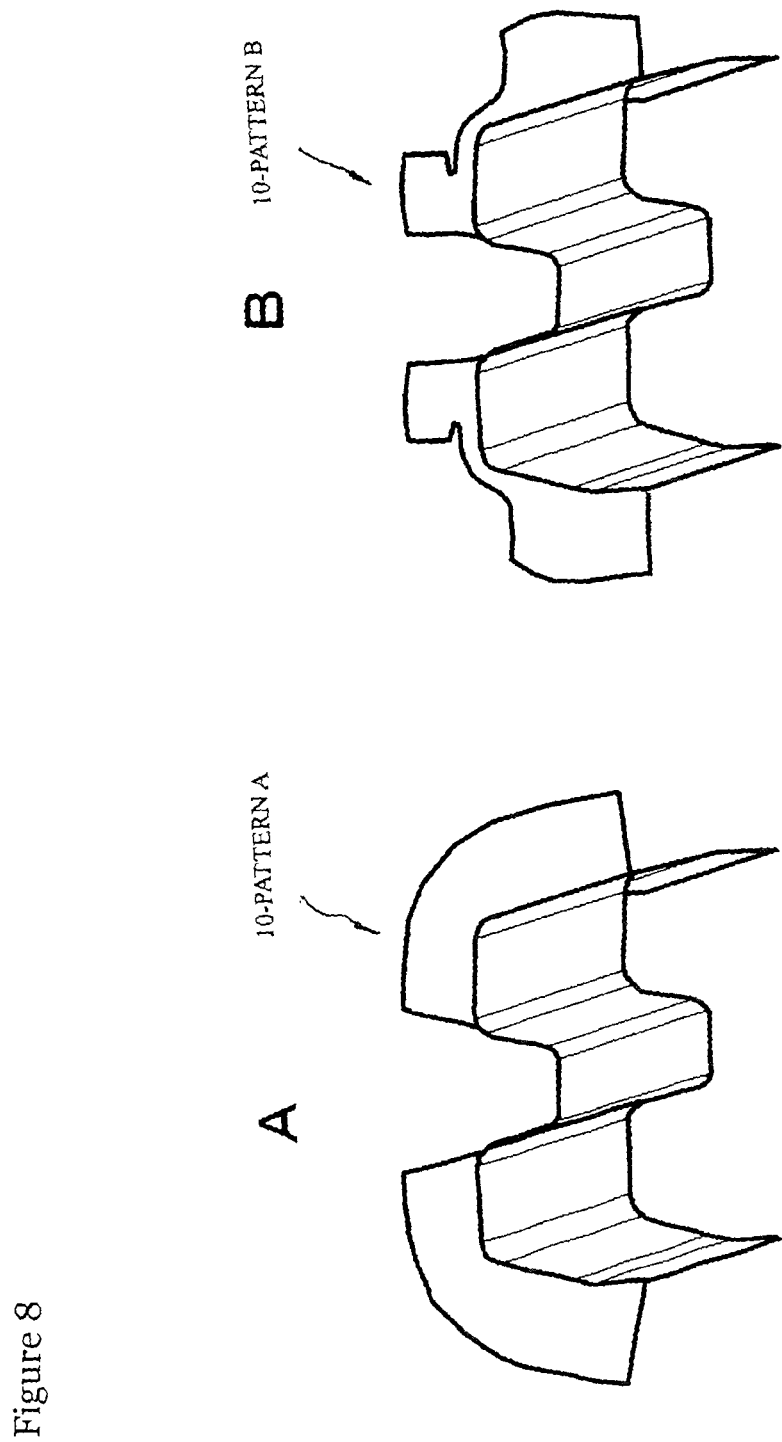
FIGS. 8A and 8B are illustrative diagrams schematically illustrating the shapes press molded bodies in the examples.

FIG. 8 is an illustrative diagram schematically illustrating the shapes of a press molded body 10-pattern A and a press molded body 10-pattern B in the examples, where FIG. 8A illustrates the case of using the developed blank 15-1, and FIG. 8B illustrates the case of using the developed blank 15-2.

Next, molded bodies were made to overlap each other at plane portions, the molded bodies being each of two first press molded bodies 10-pattern A and two second press molded body 10-pattern B to which flanges are added in groove bottom portions, the plane portions each being formed at both ends in a cross-section circumferential direction of each of the molded bodies, and the overlapping portions are subjected to spot welding to produce a tubular body 1 that includes outward flanges 5-1 to 5-4.

Next, a crash box 0 was assembled, which includes the tubular body 1 and a set plate 7 that is subjected to spot welding with the outward flanges 5-1 to 5-4 provided in an end portion of the tubular body 1 interposed therebetween, and buckling behavior at the time of applying impact load to one end of the tubular body 1 constituting the crash box 0 was analyzed by Finite Element Method (Analysis 2).

Note that there were two loading directions of the impact load, a direction parallel to the longitudinal direction of the tubular body 1 and a direction that inclines 5 degrees with respect to the longitudinal direction.

The tubular body 1 had a length of 120 mm and a cross-sectional dimension of 64 mm×93 mm The material of the blanks 15-1 and 15-2 were JSC440W (The Japan Iron and Steel Federation Standard (JFS Standard)), which is a 440 MPa-class cold-rolled steel sheet, and JSC590R (JFS Standard), which is a 590 MPa-class cold-rolled steel sheet, and there were two levels of sheet thickness, 1.0 mm and 1.2 mm.

In addition, the influence of the presence/absence of the locking sections 8-1 to 8-4 in the set plate 7 was also examined. The locking sections 8-1 to 8-4 each have shapes corresponding to the shape of a curved portion (rise-up curvature portion), having an inner R of 2 to 4 mm, and the height of the locking sections 8-1 to 8-4 is about 3 to 7 mm, which is somewhat higher than the value of the inner R.

As a conventional example, a similar analysis was conducted on a crash box produced by performing butt arc welding on a known tubular body that was butted against a set plate, the known tubular body having the cross-sectional shape of the tubular body 1 described above and not including outward flanges 5-1 to 5-4. The material of the blank was JSC440W, and there were two levels of sheet thickness, 1.0 mm and 1.2 mm.

Table 1 shows the results of Analysis 1. As illustrated in Table 1, both the developed blanks 15-1 and 15-2 can yield a press molded body that includes groove portions 3-1 and 3-2 that extends in their longitudinal direction, and outward flanges 5-1 and 5-2 or outward flanges 5-3 and 5-4 in an end portion of the longitudinal direction, but with the developed blank 15-1, as compared with the developed blank 15-2, there is a large increase in sheet thickness at the roots of the outward flanges 5-1 and 5-2 or the outward flanges 5-3 and 5-4 along ridges 2-1 and 2-2 or ridges 2-3 and 2-4, in press molding, and there is a large decrease in sheet thickness at the edges of the outward flanges 5-1 and 5-2 or the outward flanges 5-3 and 5-4 along the ridges 2-1 and 2-2 or the ridges 2-3 and 2-4.

Alternatively, in the case of using the ridge pad 17, an increase in sheet thickness at the roots and a decrease in sheet thickness at the edges are small, which is good as compared with the case of using the normal pad 14. Therefore, from the viewpoint of avoiding the occurrence wrinkles with the increase in sheet thickness and the occurrence of flange cracks with the decrease in sheet thickness, it is desirable to perform press molding using the ridge pad 17. In addition, it is desirable, as the developed blank 15-2, to make the width of the outward flanges 5-1 and 5-2 or the outward flanges 5-3 and 5-4 along the vicinity of the ridges 2-1 and 2-2 or the ridges 2-3 and 2-4 smaller than the width of the outward flanges 5-1 and 5-2 or the outward flanges 5-3 and 5-4 in the other region.

TABLE 1

| Number | Material | Sheet thickness | Developed blank | Pad | Sheet thickness fluctuations in the vicinity of ridges | |
|---|---|---|---|---|---|---|
| | | | | | Decreasing rate in sheet thickness *1 | Increase rate in sheet thickness *2 |
| 1 | JSC590R | 1.0 mm | A | Normal pad | 22% | 35% |
| 2 | JSC590R | 1.0 mm | B | Normal pad | 15% | 3% |
| 3 | JSC590R | 1.0 mm | A | Ridge pad | 17% | 19% |

*1 Outer end portions of outward flang
*2 Root portions of outward flanges

Table 2 shows principal conditions of Analysis 2, and Table 3 and Table 4 show the analysis results and weldabilities in comparison.

TABLE 2

| Example | Material and sheet thickness | Shape and width of outward flanges | Presence/absence of projecting in set plate | Collision face of impactor |
|---|---|---|---|---|
| Inventive example 1 | JSC 590R 1.0 mm | FIG. 8(a) About 15 mm over entire perimeter | Present | Perpendicular to longitudinal direction of tubular body |
| Inventive example 2 | JSC 590R 1.0 mm | FIG. 8(b) 2 mm in ridges, 15 mm in other portions | Present | Perpendicular to longitudinal direction of tubular body |
| Inventive example 3 | JSC 590R 1.0 mm | FIG. 8(b) 2 mm in ridges, 15 mm in other portions | Absent | Perpendicular to longitudinal direction of tubular body |
| Inventive example 4 | JSC 440W 1.0 mm | FIG. 8(b) 2 mm in ridges, 15 mm in other portions | Present | Perpendicular to longitudinal direction of tubular body |
| Inventive example 5 | JSC 440W 1.0 mm | FIG. 8(b) 2 mm in ridges, 15 mm in other portions | Present | Inclined 5 degrees, with respect to plane perpendicular to longitudinal direction of tubular body, about an axis of rotation that is an axis perpendicular to top surface |
| Conventional example 1 | JSC 440W 1.0 mm | Absent | Absent | Perpendicular to longitudinal direction of tubular body |
| Inventive example 6 | JSC 590R 1.2 mm | FIG. 8(a) About 15 mm over entire perimeter | Present | Perpendicular to longitudinal direction of tubular body |
| Inventive example 7 | JSC 590R 1.2 mm | FIG. 8(b) 2 mm in ridges, 15 mm in other portions | Present | Perpendicular to longitudinal direction of tubular body |
| Inventive example 8 | JSC 590R 1.2 mm | FIG. 8(b) 2 mm in ridges, 15 mm in other portions | Absent | Perpendicular to longitudinal direction of tubular body |
| Inventive example 9 | JSC 440W 1.2 mm | FIG. 8(b) 2 mm in ridges, 15 mm in other portions | Present | Perpendicular to longitudinal direction of tubular body |
| Inventive example 10 | JSC 440W 1.2 mm | FIG. 8(b) 2 mm in ridges, 15 mm in other portions | Present | Inclined 5 degrees, with respect to plane perpendicular to longitudinal direction of tubular body, about an axis of rotation that is an axis perpendicular to top surface |
| Conventional example 2 | JSC 440W 1.2 mm | Absent | Absent | Perpendicular to longitudinal direction of tubular body |

TABLE 3

| Examples | Weldability | Buckling behavior | Absorbed energy *1 | Absorbed energy *2 |
|---|---|---|---|---|
| Inventive example 1 | Good | Very stable | 98% | 118% |
| Inventive example 2 | Good | Very stable | 94% | 112% |
| Inventive example 3 | Good | Somewhat unstable | 85% | 102% |
| Inventive example 4 | Good | Very stable | 73% | 88% |
| Inventive example 5 | Good | Stable | 66% | 80% |
| Conventional example1 | Poor | — | — | — |

*1: Ratio of absorbed energy at a stroke of 90 mm, it is 100% with a conventional example 2 (to be described)
*2: Ratio of absorbed energy of per unit weight at a stroke of 90 mm, it is 100% with the conventional example 2 (to be described)

TABLE 4

| Examples | Weldability | Buckling behavior | Absorbed energy *1 | Absorbed energy *2 |
|---|---|---|---|---|
| Inventive example 6 | Good | Very stable | 127% | 127% |
| Inventive example 7 | Good | Very stable | 128% | 128% |
| Inventive example 8 | Good | Somewhat unstable | 127% | 127% |
| Inventive example 9 | Good | Very stable | 104% | 104% |
| Inventive example 10 | Good | Stable | 92% | 92% |
| Conventional example 2 | Somewhat poor *3 | Very stable | 100% | 100% |

*1: Ratio of absorbed energy at a stroke of 90 mm, it is 100% with the conventional example 2
*2: Ratio of absorbed energy of per unit weight at a stroke of 90 mm, it is 100% with the conventional example 2
*3: "Somewhat poor" means that "it can produce a good product, but it is inferior to Inventive Examples in the stability of welding in mass production"

As shown in Tables 2 and 3, the conventional Example 1 has a sheet thickness of 1.0 mm, which causes burn-through to easily occur in butt arc welding, making it difficult to produce the crash box.

In contrast to this, with the inventive examples 1 to 5, it is possible to perform spot welding on the tubular body 1 to the set plate 7 with the outward flanges 5-1 and 5-2 or the outward flanges 5-3 and 5-4 interposed therebetween, which is available for an impact energy absorbing structure for an automobile body. In particular, it was found about the inventive examples 1, 2, and 4, in which the locking sections 8-1 to 8-4 provided in the set plate 7 support the ridges 2-1 to 2-4 of the tubular body 1 from the inside thereof, that the sheet thickness thereof is 1.0 mm, but a collapse of root R portions toward the inside of the cross section in an end portion in the longitudinal direction is suppressed, resulting in a very stable buckling behavior, as with the conventional example 2 the sheet thickness of which is 1.2 mm.

In addition, as illustrated by the inventive example 5, it was found that the crash box exhibits stable buckling behavior even when a face to collide (impactor) inclines with respect to a face perpendicular to the longitudinal direction axis of the tubular body 1. Note that, in the inventive example 3, a phenomenon was recognized that the root R portions of the outward flanges 5-1 and 5-2 or the outward flanges 5-3 and 5-4 slightly collapses toward the inside of the cross section, in the initial stage of impactor stroke.

According to the present invention, it is possible to attach, by spot welding or the like, the tubular body 1 to the set plate 7 with the outward flanges 5-1 and 5-2 or the outward flanges 5-3 and 5-4 interposed therebetween, enabling the prevention of poor welding such as burn-through in conventional butt arc welding even for a tubular body 1 having a small sheet thickness, and thus it is possible to produce a lightweight crash box having an excellent impact energy absorbing performance.

In addition, it is understood by comparing between the inventive examples 9 and 10 with the conventional example 2 in Tables 2 and 4 that, according to the present invention, it is possible to ensure a good weldability while keeping substantially the same energy absorption and stable buckling behavior as those of the conventional example.

REFERENCE SIGNS LIST

0 Crash box
1 Tubular body
2-1 to 2-4 Ridge
3-1, 3-2 Groove portion
5-1 to 5-4 Outward flange

The invention claimed is:

1. A crash box comprising a longer-length metallic tubular body and a set plate including locking sections,
   the locking sections are individually formed as a part of the set plate,
      the tubular body having a basic cross-sectional shape that is a polygon surrounded by a plurality of ridges extending in a first direction and a plurality of side wall portions, the tubular body including one or more groove portions in side wall portions on long sides that are substantially parallel to a major axis direction of the cross section, the groove portions extending in the first direction, and the tubular body including a curved portion molded integrally with the tubular body and outward flanges continuing to the curved portion at an end portion of the tubular body in the first direction,
   the set plate being welded to an end of the tubular body having the outward flanges, and the locking sections being integral with the set plate and projecting upwardly from a surface of a portion of the set plate positioned within the tubular body,
   wherein the locking sections of the set plate are butted against the curved portion of the tubular body.

2. The crash box according to claim 1, wherein the polygon is a flat polygon.

3. The crash box according to claim 1, wherein the outward flanges are provided in all the ridges excluding at least regions of the end portion corresponding to a groove portion.

4. The crash box according to claim 1, wherein the tubular body is a press molded body of a metal sheet.

5. The crash box according to claim 1, wherein the metal sheet has a sheet thickness of 1.2 mm or smaller.

6. The crash box according to claim 1, wherein the metal sheet has a sheet thickness of 1.0 mm or smaller.

7. The crash box according to claim 1, wherein the metal sheet is a steel sheet having a tensile strength of 440 MPa or higher.

8. The crash box according to claim 1, wherein the metal sheet is a steel sheet having a tensile strength of 590 MPa or higher.

9. The crash box according to claim 1, wherein the polygon has at least four sides.

10. The crash box according to claim 1, wherein the set plate and the locking section have a tensile strength of 270 to 980 MPa class.

\* \* \* \* \*